United States Patent
Honda

[19]

[11] Patent Number: 5,875,405
[45] Date of Patent: Feb. 23, 1999

[54] METHOD AND SYSTEM FOR REGISTERING ABBREVIATED DIALING NUMBERS

[75] Inventor: Toshio Honda, Tokyo, Japan

[73] Assignee: NEC Corporation, Tokyo, Japan

[21] Appl. No.: 578,024

[22] Filed: Dec. 26, 1995

[30] Foreign Application Priority Data

Dec. 27, 1994 [JP] Japan .................................. 6-324315

[51] Int. Cl.⁶ .............................. H04M 3/00; H04M 1/00; H04B 1/38
[52] U.S. Cl. .......................... 455/564; 455/419; 455/418
[58] Field of Search .................................. 455/564, 418, 455/419, 420, 465, 561; 379/355, 204; 370/84

[56] References Cited

U.S. PATENT DOCUMENTS

| | | | |
|---|---|---|---|
| 5,062,132 | 10/1991 | Yasuda | 379/355 |
| 5,068,889 | 11/1991 | Yamashita | 379/355 |
| 5,127,040 | 6/1992 | D'Avello | 379/355 |
| 5,321,737 | 6/1994 | Patsiokas | 455/465 |
| 5,509,052 | 4/1996 | Chia et al. | 455/561 |
| 5,519,702 | 5/1996 | Takahashi | 370/84 |
| 5,577,110 | 11/1996 | Aquino | 379/204 |

FOREIGN PATENT DOCUMENTS

| | | | |
|---|---|---|---|
| 0 378846 | 12/1989 | European Pat. Off. | ......... H04M 1/72 |
| 5-48732 | 2/1993 | Japan . | |
| WO 92/17943 | 10/1992 | WIPO . | |

Primary Examiner—Dwayne D. Bost
Assistant Examiner—Tracy M. Legree
Attorney, Agent, or Firm—Sughrue, Mion, Zinn, Macpeak & Seas, PLLC

[57] ABSTRACT

In a mobile communication system, each mobile terminal as well as the base station are provided with a registration memory for storing abbreviated dialing data which comprises at least one pair of an abbreviated number and an identification number corresponding to the abbreviated number. The abbreviated dialing data is stored into the registration memory of a first mobile terminal by the user operating a keypads The stored abbreviated dialing data is transferred from the first mobile terminal to the base station. When a second mobile terminal requests the abbreviated dialing data stored in the base station, the base station transmits the abbreviated dialing data to the second mobile terminal. In this manner, the abbreviated dialing data is transferred from a mobile terminal to the base station and then from the base station to another mobile terminal.

17 Claims, 6 Drawing Sheets

ABBREVIATED DIALING REGISTRATION (ADR) TABLE 208

| ABBREVIATED NUMBER | AUTHORIZED ID NUMBER |
|---|---|
| 1 | ×××-××-×××× |
| 2 | △△△-△△-△△△△ |
| ⋮ | ⋮ |

CONTROL SLOT FROM MOBILE TERMINAL TO BASE STATION

CONTROL SLOT FROM BASE STATION TO MOBILE TERMINAL

DATA COMMUNICATION SLOT

R  : RAMP TIME FOR TRANSITION RESPONSE
SS : START SYMBOL
PR : PREAMBLE
UW : UNIQUE WORD
CI : CHANNEL IDENTIFICATION
I  : INFORMATION
CRC : CYCLIC REDUNDANCY CHECK

METHOD AND SYSTEM FOR REGISTERING ABBREVIATED DIALING NUMBERS

BACKGROUND OF THE INVENTION

1. Field of the Invention

The present invention generally relates to a digital mobile communication system comprising base stations and mobile terminals, and in particular to a method and system for registering abbreviated numbers into base stations and mobile terminals.

2. Description of the Related Art

Generally, an abbreviated dialing function is provided to enhance the usefulness of a telephone system. So with a digital cordless telephone system known as a personal handy phone system (PHS), there are proposed several systems having the abbreviated dialing function. For example, a confirmation system of the abbreviated numbers is disclosed in Japanese Patent Unexamined Publication No. 5-48732. In this system, abbreviated numbers are previously stored in a base Station and are transferred from the base station to a mobile telephone terminal by request so that the user can confirm those abbreviated numbers by means of speech or characters.

However, in the conventional cordless telephone system, a mobile telephone terminal can use the abbreviated dialing function within only the radio zone of a certain base station storing the abbreviated numbers. In other words, the mobile telephone terminal cannot use the abbreviated dialing function when it is located within the radio zone of another base station which does not store the same abbreviated numbers. This causes the digital cordless telephone system to reduce in usefulness.

SUMMARY OF THE INVENTION

An object of the present invention is to provide a method and system for registering abbreviated numbers so that a mobile terminal can use the abbreviated dialing function at any place within the service area of a digital mobile communication system.

Another object of the present invention is to provide a transfer method and system for transferring a set of abbreviated numbers from a mobile terminal to another.

According to an aspect of the present invention, in a mobile communication system comprising at least one base station and a plurality of mobile terminals, each mobile terminal as well as the base station are provided with a registration memory for storing abbreviated dialing data. The abbreviated dialing data is comprised of at least one pair of an abbreviated number and an identification number corresponding to the abbreviated number. After the abbreviated dialing data is stored into the registration memory of a first mobile terminal by the user operating a keypad, the abbreviated dialing data is transferred from the first mobile terminal to the base station. When a second mobile terminal requests the abbreviated dialing data stored in the registration memory of the base station, the base station transmits the abbreviated dialing data to the second mobile terminal. In this manner, the abbreviated dialing data is transferred from a mobile terminal to the base station and further from the base station to another mobile terminal.

In other words, a method according to the present invention is comprised of the following steps. First, the abbreviated dialing data is registered in the first mobile terminal, and then the abbreviated dialing data is transferred from the first mobile terminal to the base station in response to a first transfer request of the first mobile terminal for transfer of the abbreviated dialing data to the base station. In the base station, after the received abbreviated dialing data is registered, the abbreviated dialing data is transferred from the base station to the second mobile terminal in response to a second transfer request of the second mobile terminal for transfer of the abbreviated dialing data to the second mobile terminal. The abbreviated dialing data received is registered in the second mobile terminal.

The first mobile terminal transmits the first transfer request to the base station. When receiving the first transfer request, the base station transmits the acknowledgment of the first transfer request to the first mobile terminal. After receiving the acknowledgment of the first transfer request from the base station, the first mobile terminal transmits the abbreviated dialing data to the base station. Receiving the abbreviated dialing data from the first mobile terminal, the base station registers the abbreviated dialing data in the registration memory.

On the other hand, the second mobile terminal transmits the second transfer request to the base station. When receiving the second transfer request, the base station transmits the acknowledgment of the second transfer request to the second mobile terminal. Receiving the acknowledgment of the second transfer request from the base station, the second mobile terminal receives the abbreviated dialing data from the base station and registers it in the registration memory.

DETAILED DESCRIPTION OF THE PREFERRED EMBODIMENTS

Figure 1:
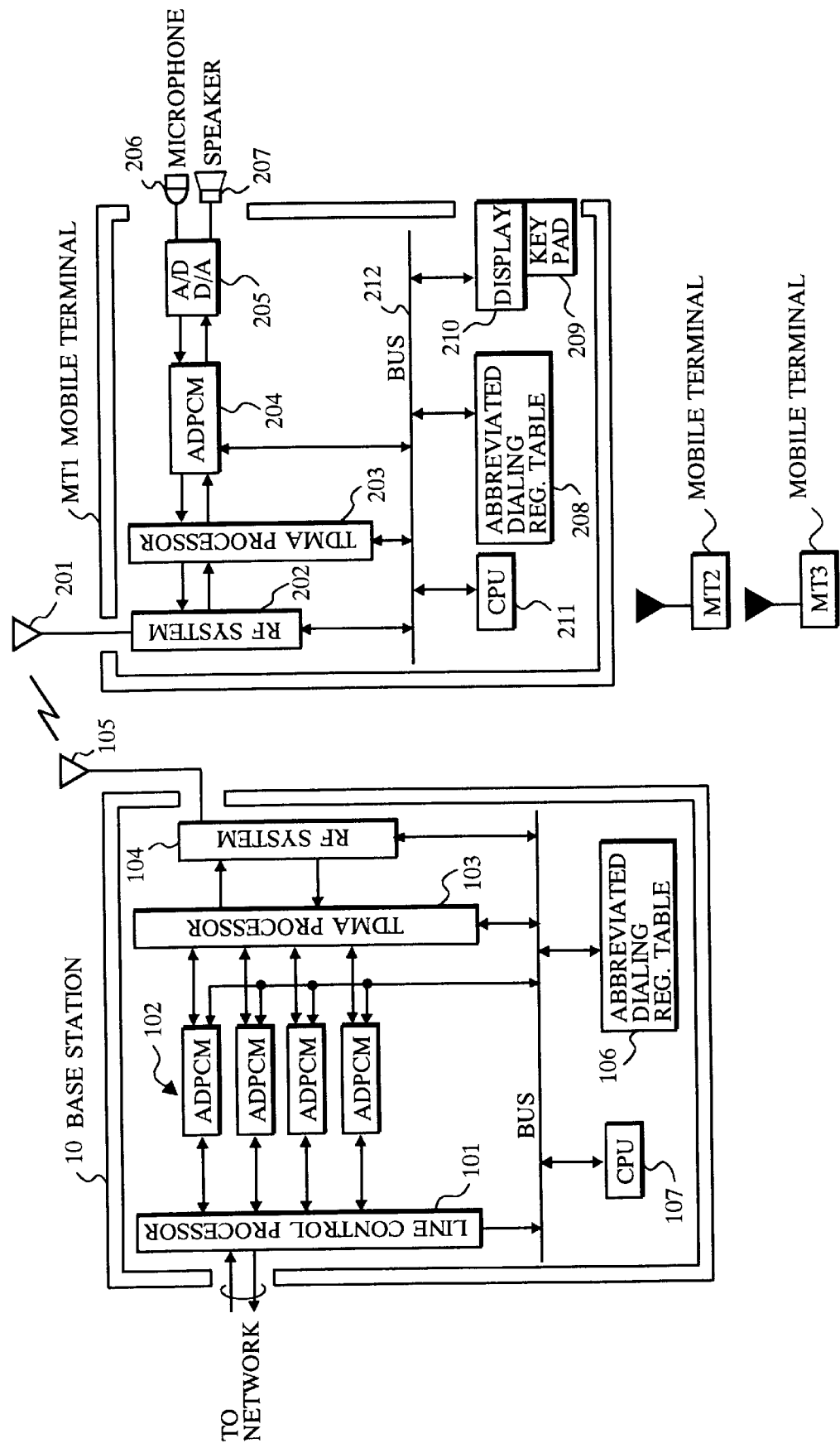
FIG. 1 is a block diagram showing the circuit configuration of a digital cordless telephone system according to an embodiment of the present invention.

Referring to FIG. 1, a digital cordless telephone system is comprised of base stations and a plurality of mobile telephone terminals. In this embodiment, it is assumed that the mobile telephone terminals MT1–MT3 are located within the radio zone of a base station 10. The base station 10 is a private base station intended for use indoors or a public base station intended for use outdoors. The respective mobile telephone terminals can be connected to the base station 10 through predetermined control and data communication channels (see FIGS. 7A–7C). The base station 10 is connected to a line or a subscriber line of a communication network such as an ISDN network.

The base station 10 is comprised of a line control processor 101 which is connected to the line as well as an ADPCM (adaptive differential pulse code modulation) circuit 102. Since four channels are multiplexed in this embodiment, the ADPCM circuit 102 includes four ADPCM codecs (coders and decoders) as shown in FIG. 1. The ADPCM circuit 102 is connected to a TDMA (time division multiple access) processor 103 which is in turn connected to a RF (radio-frequency) system 104. The RF system 104 transmits/receives radio signals to/from the mobile telephone terminals MT1–MT3 through an antenna 105. The base station is further provided with a memory for storing an abbreviated dialing registration (ADR) table 106 which has an abbreviated number field and an identification number field. A processor 107 is connected to the line control processor 101, the ADPCM circuit 102, the TDMA processor 103, the RF system 104, and the ADR table 106 through a control bus and a data bus. The operations of the base station 10 are controlled by the processor 107. As described later, the transmitting and receiving control and the input/output control of the ADR table 106 are performed by the processor 107. For instance, when receiving an abbreviated number from a mobile telephone terminal, the processor 107 searches the ADR table 106 for the identification number corresponding to the received abbreviated number, and then the identification number is use to establish the requested connection.

The respective mobile telephone terminals MT1–MT3 have the same circuit configuration. Taking the mobile telephone terminal MT1 as an example, an antenna 201 is connected to a RF system 202 which transmits/receives radio signals to/from the base station 10 through the antenna 201. The RF system 202 is connected to a TDMA processor 203 which is in turn connected to an ADPCM codec 204. The ADPCM codec 204 inputs/outputs digital speech signals from/to an analog-digital converter 205 which is connected to a microphone 206 and a speaker 207.

The mobile telephone terminal MT1 is further provided with a memory for storing an abbreviated dialing registration (ADR) table 208, a keypad 209 including a numeric keypad and an on/off-hook key, and a display 210 such as an LCD (liquid crystal display). The ADR table 208 has an abbreviated number field and an identification number field. A user may enter an abbreviated number and the corresponding identification number into the ADR table 208 through the keypad 209 with seeing numerals on the display 210. A processor 211 is connected to the RF system 202, the TDMA processor 203, the ADPCM codec 204, the ADR table 208, the keypad 209 and the display 210 through buses 212. The operations of the mobile telephone terminal MT1 are controlled by the processor 211. As described later, the transmitting and receiving control and the input/output control of the ADR table 208 are performed by the processor 211. For instance, the user presses an abbreviated number after setting the processor 211 to an abbreviated dialing mode. This starts the processor 211 searching the ADR table 208 for the corresponding identification number, and then the identification number is used to make a call to the base station 10. Alternatively, the mobile telephone terminal MT1 may transmit the abbreviated number directly to the base station 10 where the abbreviated number is converted into the corresponding identification number by the processor 107 searching the ADR table 106. In this case, the ADR table 106 of the base station 10 has to store the same ADR data as the ADR table 208 of the mobile telephone terminal MT1.

ABBREVIATED DIALING DATA REGISTRATION

Figures 2, 3:
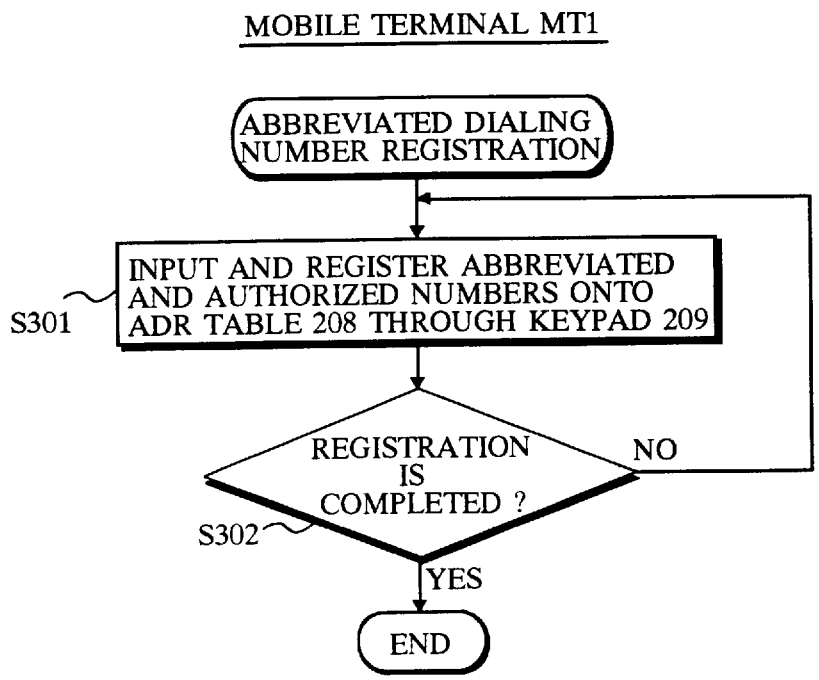
FIG. 2 is a flow chart showing the registration operation of abbreviated dialing numbers in the digital cordless telephone terminal according to the embodiment.
FIG. 3 is a schematic diagram showing the contents of an abbreviated dialing register (ADR) table of the digital cordless telephone terminal.

Referring to FIG. 2, the user of the mobile telephone terminal MT1 operates the numeric keypad of the keypad 209 to input an abbreviated number and the corresponding authorized ID number with seeing the numerals on the display 210. One record of the ADR data is transferred through the bus 212 and is registered into the ADR table 208 by the processor 211 (S301). Such a registration operation is repeated until all the records of the ADR data are registered into the ADR table 208 (S302).

Referring to FIG. 3, after all the numbers are registered, the ADR table 208 stores the ADR data comprising a plurality of pairs of an abbreviated number and the corresponding authorized ID number. For example, an abbreviated number '1' represents an authorized ID number or telephone number 'xxx-xx-xxxx'. The ADR data stored in the ADR table 208 is transferred from the mobile telephone terminal MT1 to the base station 10 and to other mobile telephone terminals through the base station 10.

ADR-DATA TRANSFER FROM MOBILE TERMINAL TO BASE STATION

Figure 4A:
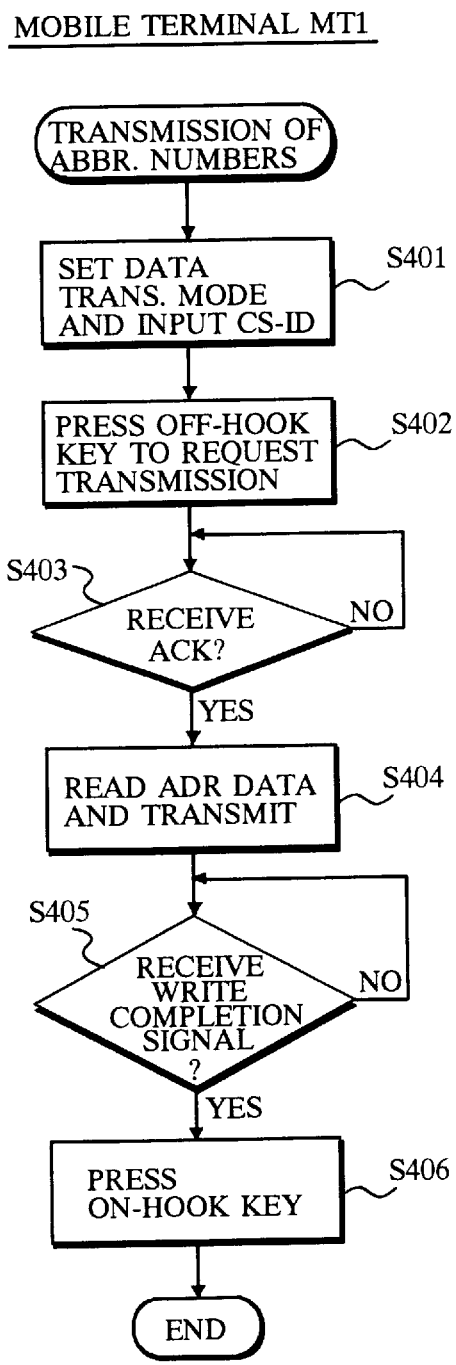
FIG. 4A is a flow chart showing the transmitting operation of abbreviated dialing data in the digital cordless telephone terminal.

Referring to FIG. 4A, the mobile telephone terminal MT1 is set to a data transmission mode and an ID number (CS-ID) of the base station 10 is input by the user operating the keypad 209 (S401). When the user presses the off-hook key, the processor 211 controls the TDMA processor 203 to transmit a transmission request signal to the base station 10 (S402). The processor 211 then starts checking whether an acknowledgment is received from the base station 10 (S403). If the acknowledgment is received (YES of S403), the processor 211 reads out the ADR data in records from the ADR table 208 and transmits a data signal conveying the ADR data to the base station 10 through the data communication channel (S404). After transmitting an end signal indicative of the end of the ADR data to the base station 10, the processor 211 waits for a write completion signal from the base station 10 (S405). If the write completion signal is received from the base station 10 (YES of S405), the processor 211 informs the user of the data transfer completion by means of displaying the message on the display 210 or sounding. Seeing the message, the user presses the on-hook key to terminate the transfer of the ADR data from the mobile telephone terminal MT1 to the base station 10 (S406).

Figure 4B:
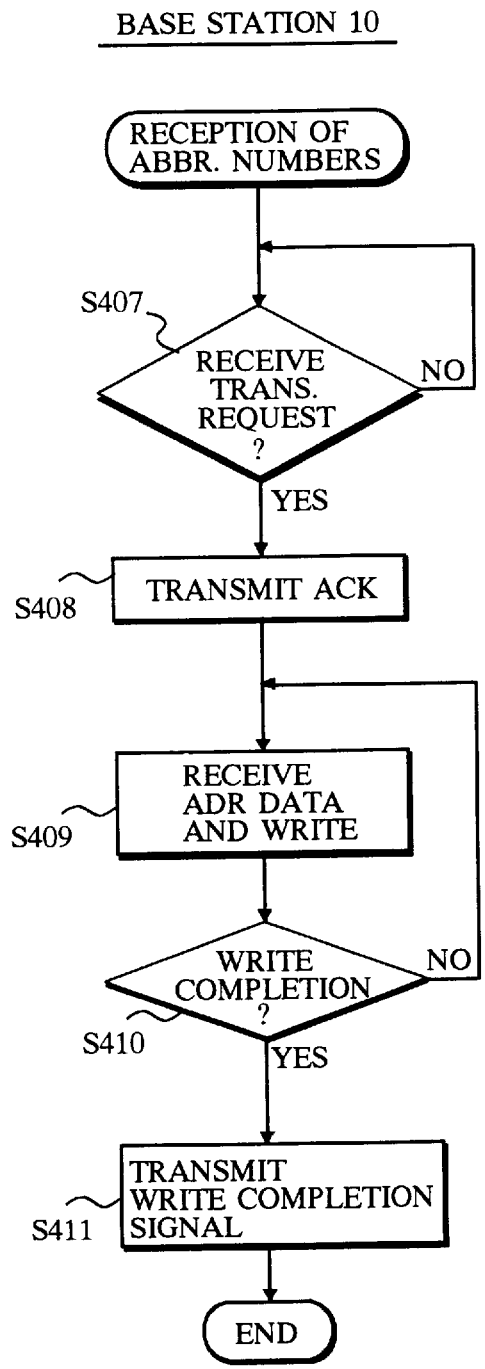
FIG. 4B is a flow chart showing the receiving operation of the abbreviated dialing data in a base station.

As shown in FIGS. 4A and 4B, paralleling the transmitting operation of the mobile telephone terminal MT1, the base station 10 performs the receiving operation as follows. When receiving the transmission request signal from the mobile telephone terminal MT1 (YES of S407), the processor 107 of the base station 10 causes the TDMA processor 103 to transmit the acknowledgment to the mobile telephone terminal MT1 and waits for the ADR data from the mobile telephone terminal MT1 (S408). When the ADR data is received from the mobile telephone terminal MT1 in records, the processor 107 controls the TDMA processor 103 and the ADR table 106 such that the respective records of the ADR data are stored onto the ADR table 106 (S409). The data write operation is repeated until all the records of the received ADR data are stored onto the ADR table 106 and the end signal is received (S410). When the data write operation is completed (YES of S410), the processor 107 generates a transmission completion signal which is transmitted to the mobile terminal MT1 (S411). In this manner, as shown in FIGS. 4A and 4B, the ADR data comprising abbreviated numbers and authorized ID numbers are transferred from the mobile telephone terminal MT1 to the base station 10.

ADR-DATA TRANSFER FROM BASE STATION TO ANOTHER MOBILE TERMINAL

Figure 5A:
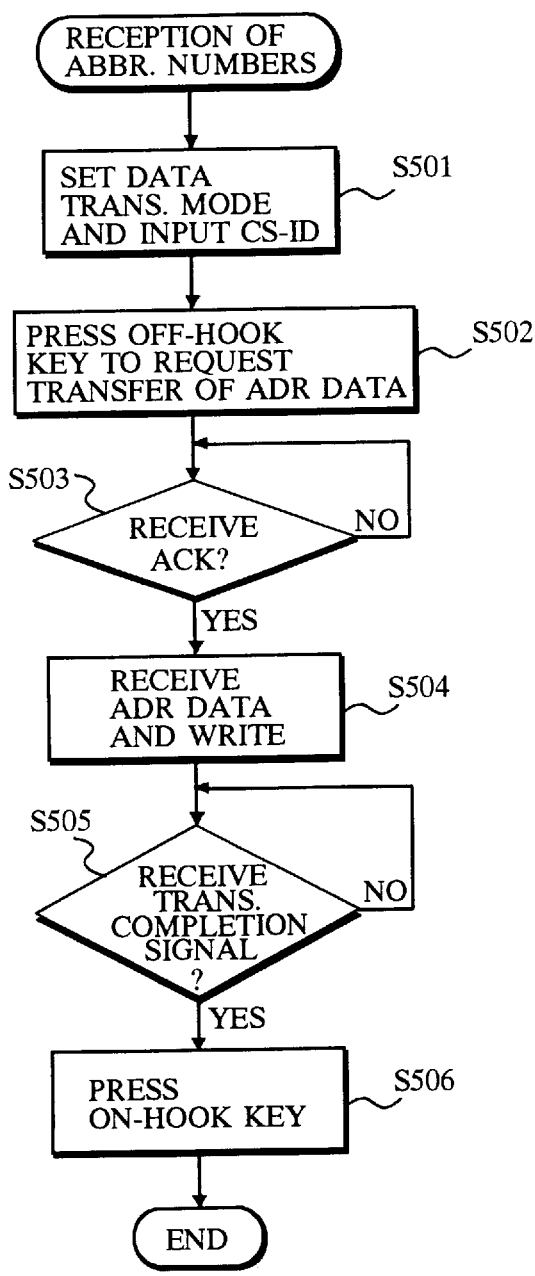
FIG. 5A is a flow chart showing the receiving operation of the abbreviated dialing data in another digital cordless telephone terminal.

Referring to FIG. 5A, another mobile telephone terminal MT2 is set to a data transmission mode and the ID number (CS-ID) of the base station 10 is input by the user operating the keypad 209 (S501). When the user presses the off-hook key, the processor 211 controls the TDMA processor 203 to transmit a transfer request signal to the base station 10 (S502). The processor 211 then starts checking whether an acknowledgment is received from the base station 10 (S503). If the acknowledgment is received (YES of S503), the processor 211 waits for the ADR data. Receiving the ADR data from the base station 10, the respective records of the ADR data are written to the ADR table 208 (S504). The data writing operation is repeated until receiving a transmission completion signal indicative of the end of the ADR data from the base station 10 (S505). If the transmission completion signal is received from the base station 10 (YES of S505), the processor 211 informs the user of the data transfer completion by means of displaying the message on the display 210 or sounding. Seeing the message, the user presses the on-hook key to terminate the transfer of the ADR data from the base station 10 to the mobile telephone terminal MT2 (S506).

Figure 5B:
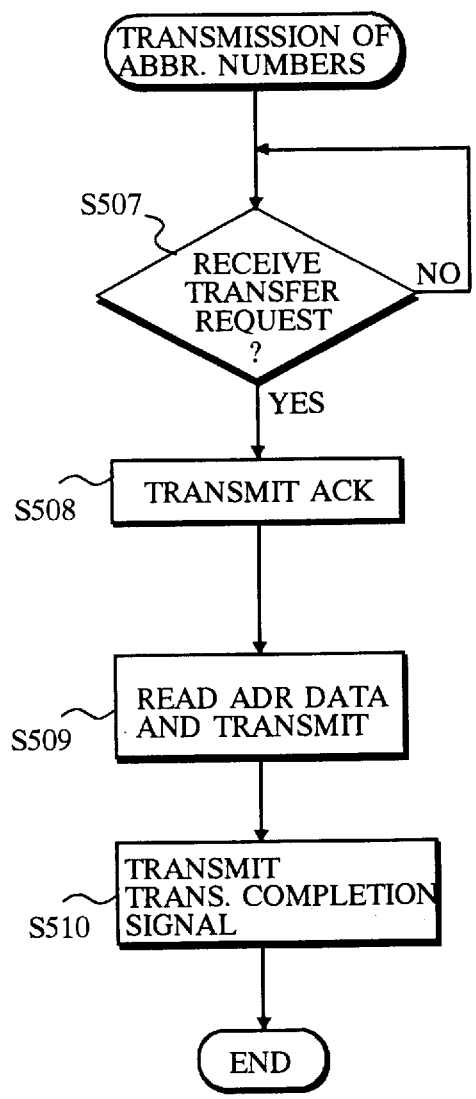
FIG. 5B is a flow chart showing the transmitting operation of the abbreviated dialing data in a base station.

As shown in FIGS. 5A and 5B, paralleling the receiving operation of the mobile telephone terminal MT2, the base station 10 performs the transmitting operation as follows. When receiving the transfer request signal from the mobile telephone terminal MT2 (YES of S507), the processor 107 of the base station 10 causes the TDMA processor 103 to transmit the acknowledgment to the mobile telephone terminal MT2 (S508). Subsequently, the processor 107 reads out the ADR data in records from the ADR table 106 to the TDMA processor 103 which transmits them to the mobile telephone terminal MT2 through the data communication channel (S509). Finally, the transmission completion signal indicative of the end of the ADR data is transmitted to the mobile telephone terminal MT2 (S510). In this manner, as shown in FIGS. 5A and 5B, the ADR data comprising abbreviated numbers and authorized ID numbers are transferred from the base station 10 to the mobile telephone terminal MT2 in response to the transfer request of the mobile telephone terminal MT2. Similarly, the same ADR data are transferred from the base station 10 to the mobile telephone terminals MT3 in response to the transfer request of the mobile telephone terminal MT3.

Figure 6:
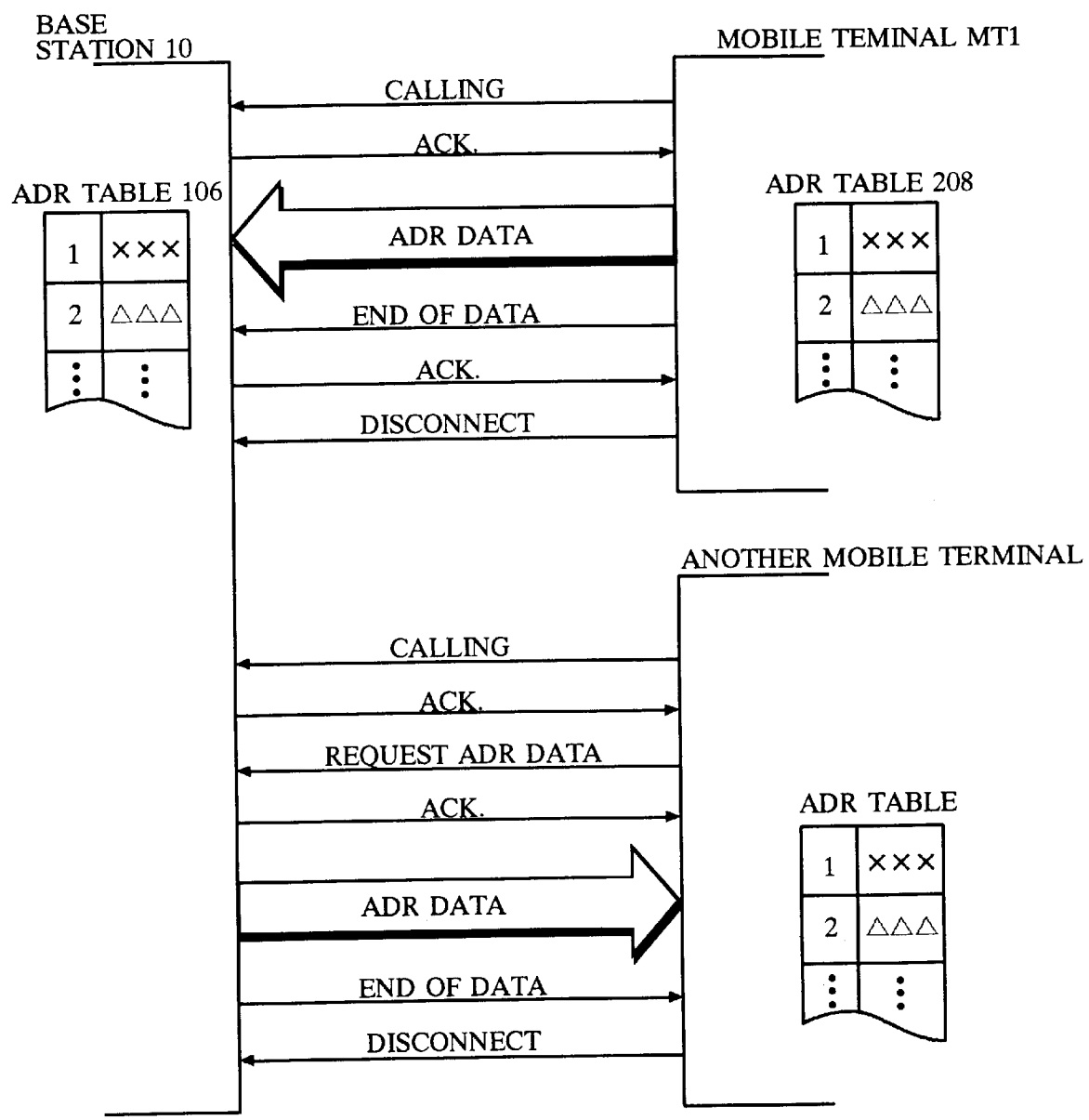
FIG. 6 is a schematic diagram showing a transfer sequence of the abbreviated dialing data between mobile telephone terminals via a base station according to an embodiment of the present invention.

FIG. 6 illustrates an example of the ADR data transfer sequence mentioned above. The ADR data stored in the ADR table 208 of the mobile telephone terminal MT1 is transferred to the ADR table 106 of the base station 10 in response to the transmission request of the mobile telephone terminal MT1. In other words, the ADR data of the mobile telephone terminal MT1 is registered in the base station 10. Another mobile telephone terminal MT2 or MT3 can obtain the ADR data registered in the base station 10 by requesting the base station 10 to transmit the ADR data. Therefore, the same ADR data can be easily registered in the base station 10 and the mobile telephone terminals MT1–MT3. Furthermore, since the ADR data stored in a mobile terminal is easily registered in a base station, the abbreviated dialing function can be used wherever the mobile terminal is located within the service area of the mobile communication system.

Figure 7A:
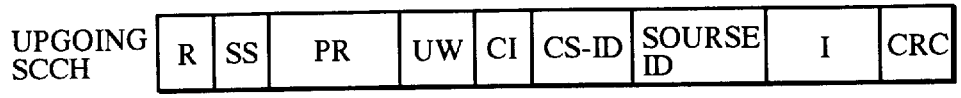
FIG. 7A is a schematic diagram showing an example of an upgoing control signal format employed in the digital cordless telephone system.
Figure 7B:
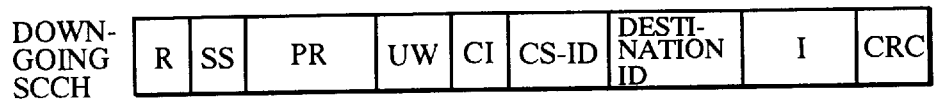
FIG. 7B is a schematic diagram showing an example of a downgoing control signal format employed in the digital cordless telephone system.
Figure 7C:
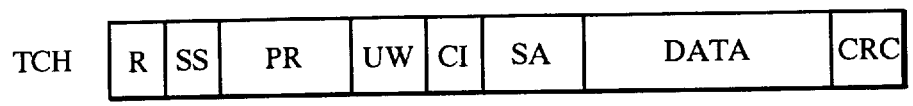
FIG. 7C is a schematic diagram showing an example of a communication signal format employed in the digital cordless telephone system.

The digital cordless telephone system of the above-mentioned embodiment may employ a specification determined according to a standard number RCR STD 28 which is provided by Research & Development Center for Radio Systems. Needless to say, the standard RCR STD 28 is just an example and another similar specification can be employed. The following signal formats according to the standard RCR STD 28 are employed in the embodiments: the respective upgoing and downgoing control signal formats as shown in FIGS. 7A and 7B and a data communication signal format as shown in FIG. 7C.

What is claimed is:

1. A method for registering abbreviated dialing data in a mobile communication system comprising at least one base station and a plurality of mobile terminals, said method comprising the steps of:

a) registering said abbreviated dialing data in a first mobile terminal;

b) transferring said abbreviated dialing data from said first mobile terminal to a base station in response to a first transfer request of said first mobile terminal for transfer of said abbreviated dialing data to said base station, said first mobile terminal being located within a service zone of said base station;

c) registering said abbreviated dialing data in said base station;

d) transferring said abbreviated dialing data from said base station to a second mobile terminal in response to a second transfer request of said second mobile terminal for transfer of said abbreviated dialing data to said second mobile terminal, said second mobile terminal being located within said service zone of said base station; and e) registering said abbreviated dialing data in said second mobile terminal.

2. The method according to claim 1, wherein the step (a) comprises the steps of:

entering said abbreviated dialing data in said first mobile terminal by keying, said abbreviated dialing data comprising at least one pair of an abbreviated number and an identification number corresponding to said abbreviated number; and storing said abbreviated dialing data into a first registration memory provided in said first mobile terminal.

3. The method according to claim 1, wherein the step (b) comprising the steps of:

at said first mobile terminal, transmitting said first transfer request to said base station;

receiving an acknowledgment of said first transfer request from said base station; and transmitting said abbreviated dialing data to said base station.

4. The method according to claim 3, wherein the step (b) further comprises the steps of:

at said base station, receiving said first transfer request from said first mobile terminal;

transmitting said acknowledgment of said first transfer request to said first mobile terminal; and receiving said abbreviated dialing data from said first mobile terminal.

5. The method according to claim 1, wherein the step (c) comprises a step of storing said abbreviated dialing data into a second registration memory provided in said base station.

6. The method according to claim 1, wherein the step (d) comprising the steps of:

at said second mobile terminal, transmitting said second transfer request to said base station;

receiving an acknowledgment of said second transfer request from said base station; and receiving said abbreviated dialing data from said base station.

7. The method according to claim 6, wherein the step (d) further comprises the steps of:

at said base station, receiving said second transfer request from said second mobile terminal;

transmitting said acknowledgment of said second transfer request to said second mobile terminal; and transmitting said abbreviated dialing data to said second mobile terminal.

8. The method according to claim 1, wherein the step (e) comprises a step of storing said abbreviated dialing data into a third registration memory provided in said second mobile terminal.

9. The method according to claim 1, wherein said base station is placed indoors and is connected to a switching system through a subscriber line, and said mobile terminal is a digital cordless communication terminal.

10. The method according to claim 1, wherein said base station is placed outdoors and is connected to an ISDN line, and said mobile terminal is a digital cordless communication terminal.

11. The method according to claim 1, wherein said mobile terminal is a digital cordless telephone.

12. The method according to claim 11, wherein said mobile terminal is a personal handy phone.

13. A system comprising:

at least one base station connected to a communication network and a plurality of mobile terminals located within a service area of said base station, said base station comprising:

first storage means for storing abbreviated dialing data;

first communication means for making communications with said plurality of mobile terminals through radio channels; and first control means for controlling said first storage means and said first communication means such that said abbreviated dialing data is received from a mobile terminal and is stored into said first storage means and said abbreviated dialing data is read out from said first storage means and is transmitted to another mobile terminal, and each one of said plurality of mobile terminals comprising:

input means for inputting said abbreviated dialing data by keying;

second storage means for storing said abbreviated dialing data;

second communication means for making a communication with said base station through a predetermined one of said radio channels; and second control means for controlling said second storage means and said second communication means such that a first transfer request for transfer of said abbreviated dialing data to said base station is transmitted to said base station and said abbreviated dialing data is transmitted to said base station through the predetermined radio channel when receiving a first acknowledgment of said first transfer request from said base station, and further controlling said second storage means and said second communication means such that a second transfer request for transfer of said abbreviated dialing data from said base station is transmitted to said base station and said abbreviated dialing data is received from said base station through the predetermined radio channel after receiving a second acknowledgment of said second transfer request from said base station.

14. The system according to claim 13, wherein said base station is placed indoors and is connected to a switching system through a subscriber line, and each of said plurality of mobile terminals is a digital cordless communication terminal.

15. The system according to claim 13, wherein said base station is placed indoors and is connected to an ISDN line, and each of said plurality of mobile terminals is a digital cordless communication terminal.

16. The system according to claim 13, wherein each of said plurality of mobile terminals is a digital cordless telephone.

17. The system according to claim 16, wherein each of said plurality of mobile terminals is a personal handy phone.

* * * * *